(12) United States Patent
Joensson et al.

(10) Patent No.: US 8,911,538 B2
(45) Date of Patent: Dec. 16, 2014

(54) METHOD AND SYSTEM FOR TREATING AN EFFLUENT STREAM GENERATED BY A CARBON CAPTURE SYSTEM

(75) Inventors: Staffan Joensson, Wohlen (CH); Bjorn Ungerer, Bad Schonborn (DE); Christoph Weingartner, Gau-Algeshein (DE); Shin G. Kang, Simsbury, CT (US); Armand A. Levasseur, Windsor Locks, CT (US)

(73) Assignee: ALSTOM Technology Ltd, Baden (CH)

( * ) Notice: Subject to any disclaimer, the term of this patent is extended or adjusted under 35 U.S.C. 154(b) by 442 days.

(21) Appl. No.: 13/334,566

(22) Filed: Dec. 22, 2011

(65) Prior Publication Data
US 2013/0160857 A1 Jun. 27, 2013

(51) Int. Cl.
*B01D 53/14* (2006.01)

(52) U.S. Cl.
USPC ............. 95/183; 96/244; 96/234; 423/228; 95/227; 95/236

(58) Field of Classification Search
None
See application file for complete search history.

(56) References Cited

U.S. PATENT DOCUMENTS

| | | |
|---|---|---|
| 2,487,576 A | 11/1949 | Meyers |
| 2,608,461 A | 8/1952 | Frazier |
| 3,255,233 A | 6/1966 | Kunze et al. |
| 3,563,696 A | 2/1971 | Benson |
| 3,751,231 A | 8/1973 | Niedzielski |
| 3,896,212 A | 7/1975 | Ecikmeyer |
| 4,122,148 A * | 10/1978 | Nicholson et al. ....... 423/243.09 |
| 4,543,190 A | 9/1985 | Modell |
| 5,043,075 A | 8/1991 | Dietmar et al. |
| 5,309,850 A | 5/1994 | Downs et al. |
| 5,318,758 A | 6/1994 | Fujii et al. |

(Continued)

FOREIGN PATENT DOCUMENTS

| | | |
|---|---|---|
| EP | 0 040 892 | 12/1981 |
| EP | 0 502 596 | 9/1992 |

(Continued)

OTHER PUBLICATIONS

Thitakamol, et al., "Environmental Impacts of Absorption-based CO2 Capture Unit for Post-combustion Treatment of Flue Gas from Coal-fired Plant", vol. 1, No. 3, Jun. 16, 2007, International Journal of Greenhouse Gas Control.

(Continued)

*Primary Examiner* — Duane Smith
*Assistant Examiner* — Pankti Patel
(74) *Attorney, Agent, or Firm* — Cynthia W. Flanigan

(57) ABSTRACT

A system for treating an effluent stream including a carbon capture system utilizing an amine-containing solution to remove carbon dioxide from a flue gas stream, the carbon capture system generating an effluent stream comprising degradation products generated by the amine-containing solution; storage means for storing at least a portion of the effluent stream, the storage means being fluidly coupled to the carbon capture system. The system also including at least one nozzle connected to a combustion zone of a boiler, the at least one nozzle being fluidly coupled to the storage means for providing at least a portion of the effluent stream present in the storage means to the combustion zone of the boiler through the at least one nozzle, wherein the effluent stream provided to the combustion zone is co-incinerated with a fuel in the combustion zone.

17 Claims, 1 Drawing Sheet

(56) References Cited

U.S. PATENT DOCUMENTS

| | | |
|---|---|---|
| 5,344,627 A | 9/1994 | Fujii et al. |
| 5,378,442 A | 1/1995 | Fujii et al. |
| 5,443,805 A | 8/1995 | Beer et al. |
| 5,547,648 A | 8/1996 | Buchanan et al. |
| 5,618,506 A | 4/1997 | Suzuki et al. |
| 5,681,158 A | 10/1997 | Knapp |
| 6,117,404 A | 9/2000 | Mimura et al. |
| 6,258,336 B1 | 7/2001 | Breen et al. |
| 6,423,282 B1 | 7/2002 | Araki et al. |
| 6,485,547 B1 | 11/2002 | Iijima |
| 6,585,882 B1 | 7/2003 | Su et al. |
| 6,638,432 B2 * | 10/2003 | Matsumoto et al. ........ 423/245.3 |
| 6,645,446 B1 | 11/2003 | Won et al. |
| 6,764,530 B2 | 7/2004 | Iijima |
| 6,800,120 B1 | 10/2004 | Won et al. |
| 6,883,327 B2 | 4/2005 | Iijima et al. |
| 6,953,558 B2 | 10/2005 | Monical |
| 7,056,482 B2 | 6/2006 | Hakka et al. |
| 7,163,615 B2 * | 1/2007 | Kato et al. ................... 205/688 |
| 7,316,737 B2 | 1/2008 | Mimura et al. |
| 7,377,967 B2 | 5/2008 | Reddy et al. |
| 7,484,956 B2 | 2/2009 | Kobayashi et al. |
| 7,776,296 B2 | 8/2010 | Sarlis |
| 7,906,086 B2 | 3/2011 | Comrie |
| 2004/0093860 A1 | 5/2004 | DeCourcy et al. |
| 2004/0226441 A1 | 11/2004 | Palmer |
| 2006/0204425 A1 | 9/2006 | Kamijo et al. |
| 2006/0248890 A1 | 11/2006 | Iijima et al. |
| 2008/0056972 A1 | 3/2008 | Iijima |
| 2008/0072762 A1 | 3/2008 | Gal |
| 2008/0223215 A1 | 9/2008 | Iijima et al. |
| 2009/0068078 A1 | 3/2009 | Grobys et al. |
| 2009/0078177 A1 | 3/2009 | Wu et al. |
| 2009/0271039 A1 | 10/2009 | Richman et al. |
| 2009/0305870 A1 | 12/2009 | Chung |
| 2010/0003177 A1 | 1/2010 | Aroonwilas et al. |
| 2010/0005722 A1 | 1/2010 | Iijima et al. |
| 2010/0050637 A1 | 3/2010 | Yamashita et al. |
| 2010/0077767 A1 | 4/2010 | Balmas et al. |
| 2010/0089231 A1 | 4/2010 | Neumann et al. |
| 2010/0092368 A1 | 4/2010 | Neumann et al. |
| 2010/0172813 A1 | 7/2010 | Nazarko et al. |
| 2010/0205964 A1 | 8/2010 | Maddaus et al. |
| 2010/0233055 A1 | 9/2010 | Gatton, Jr. et al. |
| 2010/0258005 A1 | 10/2010 | Oishi et al. |
| 2010/0281878 A1 | 11/2010 | Wormser |
| 2010/0326074 A1 | 12/2010 | Okita et al. |
| 2011/0030957 A1 | 2/2011 | Constantz et al. |
| 2011/0033359 A1 | 2/2011 | Papenheim et al. |
| 2011/0061531 A1 | 3/2011 | Neumann et al. |
| 2011/0067302 A1 | 3/2011 | Oppenheim et al. |
| 2011/0067306 A1 | 3/2011 | Balmas et al. |
| 2011/0091955 A1 | 4/2011 | Constantz et al. |
| 2011/0120012 A1 | 5/2011 | Balmas et al. |
| 2011/0226989 A9 | 9/2011 | Seeker et al. |

FOREIGN PATENT DOCUMENTS

| | | |
|---|---|---|
| EP | 0 879 631 | 5/2002 |
| EP | 1 482 243 | 2/2004 |
| EP | 1 695 756 | 8/2006 |
| EP | 2 085 133 | 8/2009 |
| EP | 2 258 461 | 12/2010 |
| EP | 2 269 711 | 1/2011 |
| EP | 2 269 712 | 1/2011 |
| EP | 2 269 713 | 1/2011 |
| EP | 2 286 894 | 2/2011 |
| EP | 2 335 802 | 6/2011 |
| EP | 2 375 012 | 10/2011 |
| FR | 2 938 454 | 2/2010 |
| GB | 871207 | 6/1961 |
| JP | 2009214089 | 9/2009 |
| JP | 2009215186 | 9/2009 |
| WO | WO 91/17814 | 11/1991 |
| WO | WO 95/30623 | 11/1995 |
| WO | WO 02/09849 | 2/2002 |
| WO | WO 03/013699 | 2/2003 |
| WO | WO 2004/005818 | 1/2004 |
| WO | 2005/069965 | 8/2005 |
| WO | WO 2005/069965 | 8/2005 |
| WO | WO 2007/009461 | 1/2007 |
| WO | WO 2007/019632 | 2/2007 |
| WO | WO 2007/068733 | 6/2007 |
| WO | WO 2007/107004 | 9/2007 |
| WO | WO 2008/094777 | 8/2008 |
| WO | WO 2008/124767 | 10/2008 |
| WO | WO 2009/003238 | 1/2009 |
| WO | WO 2009/004307 | 1/2009 |
| WO | WO 2009/025003 | 2/2009 |
| WO | WO 2009/035340 | 3/2009 |
| WO | WO 2009/065218 | 4/2009 |
| WO | WO 2009/104744 | 8/2009 |
| WO | WO 2009/112518 | 9/2009 |
| WO | WO 2010/010720 | 1/2010 |
| WO | WO 2010/051604 | 5/2010 |
| WO | WO 2010/075536 | 7/2010 |
| WO | WO 2010/101953 | 9/2010 |
| WO | WO 2010/102877 | 9/2010 |
| WO | WO 2010/105754 | 9/2010 |
| WO | WO 2010/113364 | 10/2010 |
| WO | WO 2010/122830 | 10/2010 |
| WO | WO 2010133484 | 11/2010 |
| WO | WO 2010/142716 | 12/2010 |
| WO | WO 2011/034855 | 3/2011 |
| WO | WO 2011/049996 | 4/2011 |
| WO | WO 2011/081665 | 7/2011 |
| WO | WO 2011/109359 | 9/2011 |
| WO | WO 2011/123193 | 10/2011 |

OTHER PUBLICATIONS

Shao, et al., *"Amines Used in CO2 Capture—Health and Environmental Impacts"*, Bellona Report, Sep. 2009, The Bellona Foundation, available from www.bellona.org.

* cited by examiner

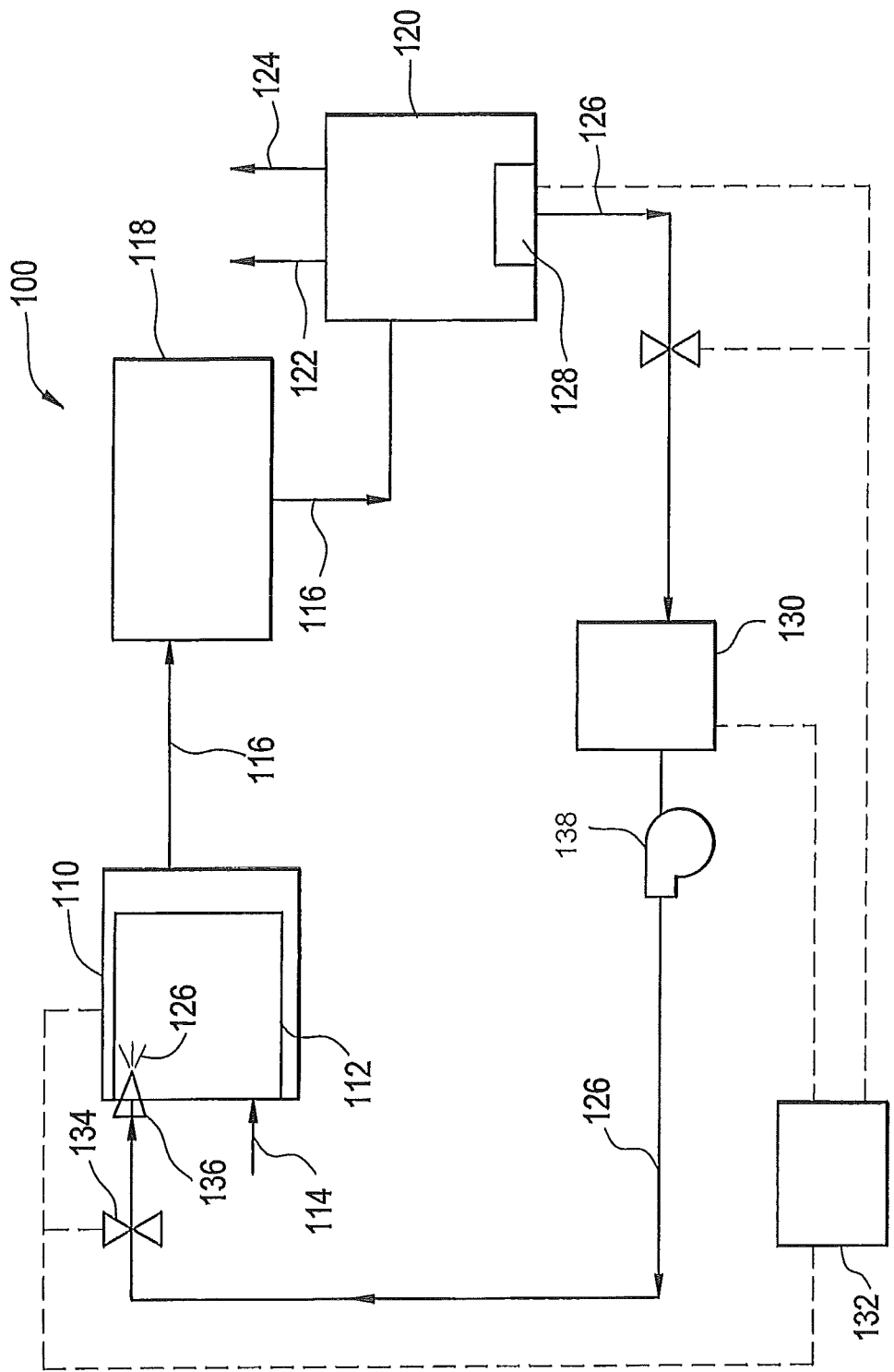

METHOD AND SYSTEM FOR TREATING AN EFFLUENT STREAM GENERATED BY A CARBON CAPTURE SYSTEM

FIELD OF THE INVENTION

The present disclosure is generally directed to the treatment of an effluent stream generated by a carbon capture system. More particularly, the present disclosure is directed to a system and method of treating an effluent stream generated by a carbon capture system that utilizes an amine-containing solution to remove carbon dioxide products from a flue gas stream.

BACKGROUND OF THE INVENTION

The combustion of a fuel, such as coal, oil, peat, waste, etc., in a combustion plant such as a power plant, generates a hot process gas stream known as a flue gas stream. In general, the flue gas stream contains particulates and gaseous contaminants such as carbon dioxide ($CO_2$). The negative environmental effects of releasing $CO_2$ to the atmosphere have been recognized, and have resulted in the development of processes adapted for removing or reducing the amount of $CO_2$ from the flue gas streams. One such system and process is directed to the utilization of amine-containing solutions. Amine-containing solutions can efficiently remove $CO_2$, as well as other contaminants, such as sulfur dioxide and hydrogen chloride, from a flue gas stream.

Treatment of the flue gas stream with amine-containing solutions results in an effluent stream that may be regenerated and recirculated throughout the system. However, there are often degradation products produced by the reactions between the amine-containing solution and the contaminants present in the flue gas stream. Those degradation products should be removed as they impact the ability and the effectiveness of the regenerated and recirculated amine-containing solutions to absorb $CO_2$.

To safeguard the efficiency of the system, and to comply with emission standards, treatment or removal of the degradation products from the system is desired.

SUMMARY OF THE INVENTION

According to aspects disclosed herein, there is provided a system for treating an effluent stream generated by a carbon capture system, the system comprising: a carbon capture system utilizing an amine-containing solution to remove carbon dioxide from a flue gas stream, the carbon capture system generating an effluent stream comprising degradation products generated by the amine-containing solution; storage means for storing at least a portion of the effluent stream, the storage means being fluidly coupled to the carbon capture system; and at least one nozzle connected to a combustion zone of a boiler, the at least one nozzle being fluidly coupled to the storage means for providing at least a portion of the effluent stream present in the storage means to the combustion zone of the boiler through the at least one nozzle, wherein the effluent stream provided to the combustion zone is co-incinerated with a fuel in the combustion zone.

According to another aspect disclosed herein, there is described a method for treating an effluent stream generated by a carbon capture system, the method comprising: contacting an amine-containing solution and a flue gas stream in a carbon capture system to remove carbon dioxide from the flue gas stream, the carbon capture system generating an effluent stream comprising degradation products; providing at least a portion of the effluent stream to a storage means fluidly coupled to the carbon capture system; and removing at least a portion of the effluent stream from the storage means for introduction to a combustion zone of a boiler through at least one nozzle fluidly coupled to the storage means and the combustion zone, wherein the effluent stream introduced to the combustion zone is combusted together with a fuel, thereby treating the effluent stream.

The above described and other features are exemplified by the following figures and in the detailed description.

BRIEF DESCRIPTION OF FIGURES

With reference now to the figures where all like parts are numbered alike;

FIG. 1 is a schematic diagram a flue gas treatment system as described herein.

DETAILED DESCRIPTION

As illustrated in FIG. 1, a flue gas treatment system is generally designated by the numeral 100 and includes a boiler 110 having a combustion zone 112. A fuel 114 is combusted in the combustion zone 112 to generate a flue gas stream 116.

The fuel 114 may be any type of fuel capable of combustion. Types of fuel include, but are not limited to: coal, peat, waste, oil, gas, and the like. Combustion of the fuel 114 generates the flue gas stream 116, which contains contaminants in both physical and gaseous form. Examples of contaminants present in the flue gas stream 116 include, but are not limited to sulfur oxides (SOx), nitrogen oxides (NOx), carbon dioxide ($CO_2$), fly ash, dust, soot, mercury, and the like.

Prior to releasing the flue gas stream 116 into an environment such as the atmosphere, the flue gas stream undergoes processing to remove or reduce the amount of contaminants present in the flue gas stream. As shown in FIG. 1, the flue gas stream 116 is released from the boiler 110 and provided to a fluidly connected air quality control system (AQCS) 118. The AQCS 118 may include one or more systems and/or devices that remove or reduce an amount of one or more types of contaminants present in the flue gas stream 116. The systems present in the AQCS 118 may vary depending on the system 100 and the fuel 114 combusted in the boiler 110. The AQCS 118 may include one or more of a particulate collector, a wet flue gas desulfurization system (WFGD), a dry flue gas desulfurization system (DFGD), a selective catalytic reduction (SCR) system and the like.

After being processed by the one or more systems present in the AQCS 118, the flue gas stream 116 is provided to a fluidly connected carbon capture system 120. The carbon capture system 120 utilizes an amine-containing solution to remove at least a portion of carbon dioxide from the flue gas stream 116. The amine-containing solution includes a chemical solvent and water, where the chemical solvent contains, for example, primary, secondary and/or tertiary alkanolamines; primary and/or secondary amines; sterically hindered amines; severely sterically hindered secondary aminoether alcohols or combinations thereof. Examples of commonly used chemical solvents include, but are not limited to: monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol (also called diethyleneglycolamine or DEGA), 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy)ethanol, 2-(2-(1-methyl-1-ethylpropylamino)ethoxy)ethanol, and the like.

The foregoing chemical solvents may be used in the amine-containing solution either individually or in combination, and with or without other co-solvents, additives such as anti-foam agents, buffers, metal salts and the like, as well as corrosion inhibitors. Examples of corrosion inhibitors include, but are not limited to heterocyclic ring compounds selected from the group consisting of thiomopholines, dithianes and thioxanes wherein the carbon members of the thiomopholines, dithianes and thioxanes each have independently H, $C_{1-8}$ alkyl, $C_{7-12}$ alkaryl, $C_{6-10}$ aryl and/or $C_{3-10}$ cycloalkyl group substituents; a thiourea-amine-formaldehyde polymer and the polymer used in combination with a copper (II) salt; an anion containing vanadium in the plus 4 or 5 valence state; and other known corrosion inhibitors.

The removal of carbon dioxide from the flue gas stream 116 in the carbon capture system 120 generates a stream of carbon dioxide 122 that is released from the carbon capture system for further use or storage (not shown). Removal of carbon dioxide from the flue gas stream 116 also generates a cleaned flue gas stream 124. The cleaned flue gas stream 124 may be released to the atmosphere via a stack (not shown) or sent to another section of the system 100 for further processing and/or treatment.

Using an amine-containing solution to remove carbon dioxide from the flue gas stream 116 results in the generation of products from the degradation of the amine-containing solution, residual amines and other compounds that reduce the efficacy and efficiency of the amine-containing solution when it is regenerated for re-use within the carbon capture system 120 (the products are hereinafter referred collectively as "degradation products"). To maintain the efficiency and efficacy of the amine-containing solution, as well as the carbon capture system 120, the degradation products should be removed before the amine-containing solution is re-used within the carbon capture system 120. The degradation products may be removed from the amine-containing solution by one or more processes known in the art. The removal of the degradation products results in the generation of an effluent stream 126. The effluent stream 126 is generated by the carbon capture system 120, and contains the degradation products removed from the amine-containing solution. In one embodiment, the effluent stream 126 is generated by the reclaimer section 128 in the carbon capture system 120.

The degradation products present in the effluent stream 126 typically prevent the effluent stream from being treated in a municipal water facility. Thus, to prevent release of the degradation products into the environment the system 100 as shown in FIG. 1, maintains the effluent stream 126 within the system by recycling the effluent stream within the system to treat it.

As shown in FIG. 1, at least a portion of the effluent stream 126 is provided from the carbon capture system 120 to a fluidly connected storage means 130. The storage means 130 is any device or apparatus that is capable of holding and storing at least a portion of the effluent stream. Examples of storage means 130 include, but are not limited to, tanks, vessels, silos, containers, and the like.

The storage means 130 is fluidly coupled to the carbon capture system 120 by way of conduits, channels, tubing, or the like. In one embodiment, the storage means 130 is fluidly coupled to the reclaimer section 128 of the carbon capture system 120. While not illustrated in FIG. 1, it is contemplated that the system 100 may include more than one storage means 130 that are fluidly coupled to the carbon capture system 120.

The storage means 130 holds the effluent stream 126 until it is provided to the combustion zone 112 of the boiler 110. In one embodiment, the amount of effluent stream 126 that is provided to the storage means 130 may determine how long the effluent stream is stored in the storage means. For instance, if there is only a small amount of effluent stream 126 that is provided to the storage means 130, the effluent stream may be provided directly and immediately to the combustion zone 112 and not be held or maintained in the storage means for any length of time. In another embodiment, if there is a large amount of effluent stream 126 provided to the storage means 128 such that all of the effluent stream cannot be immediately provided to the combustion zone, the effluent stream is maintained in the storage means 130.

It is contemplated that the system 100 may have a control means 132. Control means 132 may be any device or apparatus that the user of the system 100 can implement to control and manipulate the processes and devices within the system. For example, the control means 132 may be a computer such as a desktop or a laptop, a programmable logic controller, or a mobile device such as a tablet, a smart phone or a personal digital assistant. As shown in FIG. 1, the control means 132 is coupled to the boiler 110, the storage means 130 and the carbon capture system 120 via the reclaimer 128, however it is contemplated that the control means 132 can be coupled to other devices within the system 100. The control means 132 may be coupled to the boiler 110, the storage means 130 and the reclaimer 128 through wired or wireless means as known in the art.

The control means 132 may provide a feedback loop that allows control of how and when the effluent stream 126 is provided from the carbon capture system 120 to the storage means 130 and/or the control of how and when the effluent stream is provided from the storage means to the combustion zone 112. To assist in controlling the effluent stream 126 that is provided to the storage means 130 and the combustion zone 112, the control means may be coupled to one or more valves 134 that open and close to allow the flow of the effluent stream. The control means 132 may be coupled to the valves 134 through wired or wireless means as known in the art. The parameters for controlling the opening and closing of the valves 134 will vary from plant to plant.

As shown in FIG. 1, the storage means 130 is fluidly coupled to a pump 138. The pump 138 facilitates providing the effluent stream 126 to the combustion zone 112. While not shown in FIG. 1, it is contemplated that there may be more than one pump 138 positioned between the storage means 130 and the combustion zone 112. Also, it is contemplated that there may be a pump positioned between, and fluidly coupled to, the storage means 130 and the carbon capture system 120. Additionally, it is noted that if there is more than one storage means 130 in the system 100, it is contemplated that each of the storage means has a pump 138 fluidly coupled thereto.

After leaving the storage means 130, the effluent stream 126 is provided to the combustion zone through one or more nozzles 136. The one or more nozzle 136 are connected to the boiler 110 and more specifically, are connected to the combustion zone 112, so that when the effluent stream 126 flows through the nozzle it is provided directly to the combustion zone. Once in the combustion zone 112, the effluent stream 126 is co-incinerated with the fuel 114.

Incineration of the effluent stream 126 oxides at least a portion of the degradation products present in the effluent stream to form oxidation products. The incineration of the effluent stream 126 and the fuel 114 creates the flue gas stream 116 that is processed in the system 100 as described herein. Any oxidation products and any remaining degradation products that are released in the flue gas stream 116 will be removed either by the AQCS 118 or the carbon capture system 120. Additionally, any degradation products remaining in the flue gas 116 that are not removed by the AQCS 118 or the carbon capture system 120 may ultimately be removed from the carbon capture system via the effluent stream 126.

By treating the effluent stream 126 through co-incineration with the fuel 114, the system 100 does not generate additional waste products that must be treated outside of the system. Furthermore, the treatment of the effluent stream 126 through co-incineration with the fuel 114, there is no additional energy load that is added to the system 100 since incineration of the fuel is already conducted.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for treating an effluent stream generated by a carbon capture system, the system comprising:
   a carbon capture system utilizing an amine-containing solution to remove carbon dioxide from a flue gas stream, the carbon capture system generating an effluent stream comprising degradation products generated by the amine-containing solution;
   storage means for storing at least a portion of the effluent stream, the storage means being fluidly coupled to the carbon capture system; and
   at least one nozzle connected to a combustion zone of a boiler, the at least one nozzle being fluidly coupled to the storage means for providing at least a portion of the effluent stream present in the storage means to the combustion zone of the boiler through the at least one nozzle, wherein the effluent stream provided to the combustion zone is co-incinerated with a fuel in the combustion zone.

2. A system according to claim 1, wherein the amine-containing solution comprises a chemical solvent selected from the group consisting of monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol, 2-(2-tert-butylaminopropoxy)ethanol, 2-(2-tertbutylaminoethoxy)ethanol (TBEE), 2-(2-tert-amylaminoethoxy)ethanol, 2-(2-isopropylaminopropoxy)ethanol, or 2-(2-(1-methyl-1-ethylpropylamino)ethoxy)ethanol.

3. A system according to claim 1, wherein the carbon capture system comprises a reclaimer section, the reclaimer section generating the effluent stream.

4. A system according to claim 3, wherein the reclaimer section is fluidly coupled to the storage means.

5. A system according to claim 1, further comprising a pump positioned between the storage means and the at least one nozzle, the pump adapted to provide the effluent stream to the at least one nozzle for introduction to the combustion zone.

6. A system according to claim 1, wherein the fuel is selected from the group consisting of oil, gas, coal, peat and waste.

7. A system according to claim 1, further comprising control means for controlling the effluent stream provided from the carbon capture system to the storage means.

8. A system according to claim 7, wherein the control means controls the effluent stream provided from the storage means to the combustion zone.

9. A system according to claim 7, wherein the control means is selected from the group consisting of a computer, a programmable logic controller, and a mobile device.

10. A method for treating an effluent stream generated by a carbon capture system, the method comprising:
    contacting an amine-containing solution and a flue gas stream in a carbon capture system to remove carbon dioxide from the flue gas stream, the carbon capture system generating an effluent stream comprising degradation products;
    providing at least a portion of the effluent stream to a storage means fluidly coupled to the carbon capture system; and
    removing at least a portion of the effluent stream from the storage means for introduction to a combustion zone of a boiler through at least one nozzle fluidly coupled to the storage means and the combustion zone, wherein the effluent stream introduced to the combustion zone is combusted together with a fuel, thereby treating the effluent stream.

11. A method according to claim 10, wherein the amine-containing solution comprises a chemical solvent selected from the group consisting of monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol, 2-(2-tert-butylaminopropoxy)ethanol, 2-(2-tertbutylaminoethoxy)ethanol (TBEE), 2-(2-tert-amylaminoethoxy)ethanol, 2-(2-isopropylaminopropoxy)ethanol, or 2-(2-(1-methyl-1-ethylpropylamino)ethoxy)ethanol.

12. A method according to claim 10, wherein the carbon capture system comprises a reclaimer section, the reclaimer section generating the effluent stream.

13. A method according to claim 12, wherein the reclaimer section is fluidly coupled to the storage means.

14. A method according to claim 10, further comprising positioning a pump between the storage means and the at least one nozzle, the pump adapted to provide the effluent stream to the at least one nozzle for introduction to the combustion zone.

15. A method according to claim 10, wherein the fuel is selected from the group consisting of oil, gas, coal, peat and waste.

16. A method according to claim 10, further comprising:
    controlling, through control means, a flow of the effluent stream from the carbon capture system to the storage means.

17. A method according to claim 16, further comprising:
    controlling, through the control means, a flow of the effluent stream from the storage means to the combustion zone.

* * * * *